United States Patent
Shimomura (10) Patent No.: US 7,224,261 B2
(45) Date of Patent: May 29, 2007

(54) VEHICLE SECURITY SYSTEM

(75) Inventor: Toshio Shimomura, Chiryu (JP)

(73) Assignee: DENSO Corporation, Kariya (JP)

( * ) Notice: Subject to any disclaimer, the term of this patent is extended or adjusted under 35 U.S.C. 154(b) by 191 days.

(21) Appl. No.: 11/052,063

(22) Filed: Feb. 8, 2005

(65) Prior Publication Data

US 2005/0179320 A1 Aug. 18, 2005

(30) Foreign Application Priority Data

Feb. 18, 2004 (JP) ............................. 2004-041003

(51) Int. Cl.
*B60R 25/10* (2006.01)

(52) U.S. Cl. .............................. 340/426.11; 340/425.5; 340/426.1; 340/426.12; 340/539.1

(58) Field of Classification Search ........... 340/426.11, 340/425.5, 426.1, 426.12, 426.13, 426.14, 340/539.1, 539.16, 539.17, 5.1, 5.51
See application file for complete search history.

(56) References Cited

U.S. PATENT DOCUMENTS

| | | | | |
|---|---|---|---|---|
| 5,513,244 A | * | 4/1996 | Joao et al. | ................ 455/404.1 |
| 6,046,687 A | * | 4/2000 | Janky | ......................... 340/988 |
| 6,900,723 B2 | * | 5/2005 | Yamanaka et al. | ....... 340/426.1 |
| 7,026,918 B2 | * | 4/2006 | Briick | .................... 340/426.11 |

FOREIGN PATENT DOCUMENTS

| | | |
|---|---|---|
| JP | A-H08-324388 | 12/1996 |
| JP | A-H10-35417 | 2/1998 |
| JP | A-2003-40082 | 2/2003 |
| JP | A-2003-146185 | 5/2003 |

* cited by examiner

*Primary Examiner*—Daryl C. Pope
(74) *Attorney, Agent, or Firm*—Posz Law Group, PLC (57) ABSTRACT

When transmitting an instruction for activating an immobilizer function to a vehicle, a base station also transmits a given password for releasing the immobilizer function. When receiving the instruction and the given password, an immobilizer ECU outputs an instruction for prohibiting an engine from starting. Prohibition of engine start is released only when the given password is inputted on a display. Therefore, a regular user alone, who knows the given password, can start the engine.

8 Claims, 7 Drawing Sheets

VEHICLE SECURITY SYSTEM

CROSS REFERENCE TO RELATED APPLICATIONS

This application is based on and incorporates herein by reference Japanese Patent Application No. 2004-41003 filed on Feb. 18, 2004.

FIELD OF THE INVENTION

The present invention relates to a vehicle security system that uses wireless communications to prohibit a driving device of a vehicle from starting when the vehicle is stolen. In particular, in this vehicle security system, the prohibited state is released by inputting a password.

BACKGROUND OF THE INVENTION

There is proposed a vehicle security system that is designed to prevent an unauthorized use of a stolen vehicle by disabling the use of the vehicle or deter a robbery of a vehicle by openly disclosing that a vehicle is mounted with the function of disabling the use of the stolen vehicle.

This security system is equipped with an immobilizer function that is to be remotely activated. When a vehicle mounted with this system is stolen, the following takes place. A regular owner of the stolen vehicle reports the robbery of the vehicle to a base station. The base station thereby transmits to the stolen vehicle an instruction signal for activating the immobilizer function using wireless communications. The vehicle that has received the instruction signal activates the immobilizer function so as to prohibit the engine from being started. Here, when the engine is running, the security system forcibly stops the running engine and then prohibits a re-starting of the engine, or, in view of safety, prohibits the re-starting of the engine after the running engine once stops (e.g., refer to Patent document 1).

Patent document 1: JP 2003-146185 A

In the above security system, releasing the activated immobilizer function after the stolen vehicle is sought out is performed so as to re-start the engine only by the following: a regular key capable of releasing the immobilizer function; or transmission of an instruction signal, which requests releasing of the immobilizer function, from the base station. Here, the regular key transmits a unique ID code so as to release the immobilizer function.

Therefore, when the vehicle is stolen along with the regular key, the robber of the vehicle can release the immobilizer function, possibly decreasing the meaning of the immobilizer function. Further, when the instruction signal to release the function is transmitted from the base station but the stolen vehicle is under a situation where the vehicle cannot receive the transmitted instruction signal, the immobilizer function cannot be released. This incapability of receiving the signal by the vehicle occurs: when the vehicle is parked at a place such as a basement or a tunnel; where no radio waves reach; or when the receiver mounted in the vehicle for the instruction signal is broken.

SUMMARY OF THE INVENTION

It is an object of the present invention to provide a vehicle security system where an immobilizer function is released only by a regular owner or an authorized person after a stolen vehicle is sought out. This system can function even when a regular key is stolen along with the vehicle, or even when the sought vehicle is located at a place where no radio waves reach.

To achieve the above object, a vehicle security system is provided with the following. A driving-device controlling unit is included for controlling a driving device provided in a vehicle. A signal receiving unit is included for receiving a signal that is transmitted from a wireless base station and requires the driving device to be prohibited from starting. A password inputting unit is included for inputting a password. A prohibition instruction outputting unit is included for outputting an instruction for prohibiting the driving device from starting, to the driving-device controlling unit based on the signal received by the signal receiving unit. Further, a permission instruction outputting unit is included for outputting an instruction for allowing the driving device, which is prohibited from starting, to start, to the driving-device controlling unit based on that the password is inputted by the password inputting unit.

That is, this vehicle security system includes a remote-activated immobilizer function where start of a driving device mounted in a vehicle is prohibited by a signal transmitted from a base station. Further, prohibiting of the start is released by inputting a password. When a vehicle is stolen, an instruction signal for requiring activation of an immobilizer function is transmitted from the base station to thereby disable the start of the driving device. Even when a regular key is stolen as well as the vehicle itself, the driving device cannot be started by a person who does not know the password. Further, the start of the driving device can be achieved by inputting the password, regardless of whether the reception device of the sought-out vehicle is able to receive the signal from the base station.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
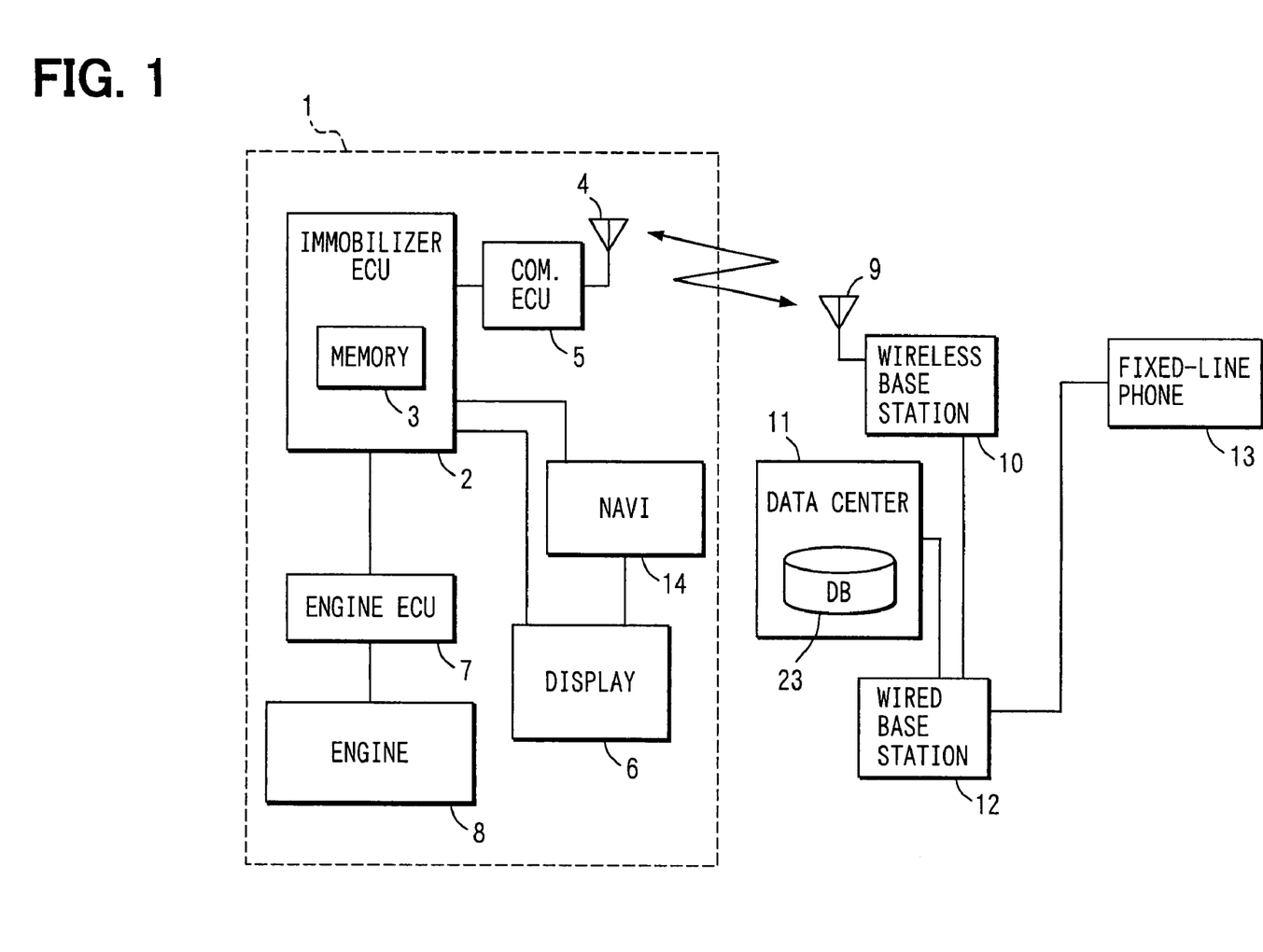
FIG. 1 is a diagram showing a schematic structure of a vehicle security system according to a first embodiment of the present invention.

The present invention is directed to a vehicle security system mounted in a vehicle 1. As shown in FIG. 1 showing the schematic structure of the system, the system includes, in a vehicle 1, a communications ECU 5 having an antenna 4 for wireless communications with a wireless base station 10; an engine ECU 7 controlling an engine 8 of a driving device for the vehicle 1; a display 6 installed around a driver's seat in an interior of the vehicle 1; an immobilizer ECU 2 that transmits to the engine ECU 7 a prohibition instruction for prohibiting the engine 8 from starting or a release instruction for releasing the start prohibition. Here, the immobilizer ECU 2 includes a memory unit 3 composed of a non-volatile storage unit.

The display 6 is a multi-purpose display (or electro-multi-vision (EMV)) that shows map information relating to a navigation system 14 mounted in the vehicle 1 or shows settings for air-conditioning units (not shown) mounted in the vehicle 1. The display 6 is not dedicated to this vehicle security system. The display 6 includes a so-called touch panel function where only touching buttons shown in a screen enables manipulating the buttons. The navigation system 14 is mounted with the GPS (Global Positioning System) and map data, to thereby recognize a current position of the vehicle 1.

The wireless base station 10 includes an antenna 9 that executes wireless communications with the vehicle 1, and interfaces via a wired communications base station 12 with a data center 11 and fixed-line phones (instead of cell phones or mobile phones) disposed at homes of vehicle users who are previously registered. Although the wired communications base station 12 interfaces multiple fixed-line phones, only a representative fixed-line phone 13 possessed by a user of the vehicle 1 is shown in FIG. 1.

The data center 11 has a rewritable database 23 that stores information relating to the previously registered vehicle users, e.g., addresses, phone numbers, birth dates, voice patterns, and registration numbers that identify respective vehicles.

Next, the operations of the thus structured vehicle security system will be explained with reference to FIG. 2.

When the vehicle 1 is stolen, a user of the vehicle 1 reports to the data center 11 the vehicle robbery using the fixed-line phone 13.

The data center 11 that receives the report of the vehicle robbery confirms that the user is the regular user, and then transmits to the wireless base station 10 a prohibition instruction of a start prohibition for prohibiting the engine 8 from starting, i.e., an activating instruction (or immobilizer-set instruction) for activating a remote-activated immobilizer function, and a password for releasing the start prohibition, i.e., unsetting (or releasing) the remote-activated immobilizer function.

Figure 6:
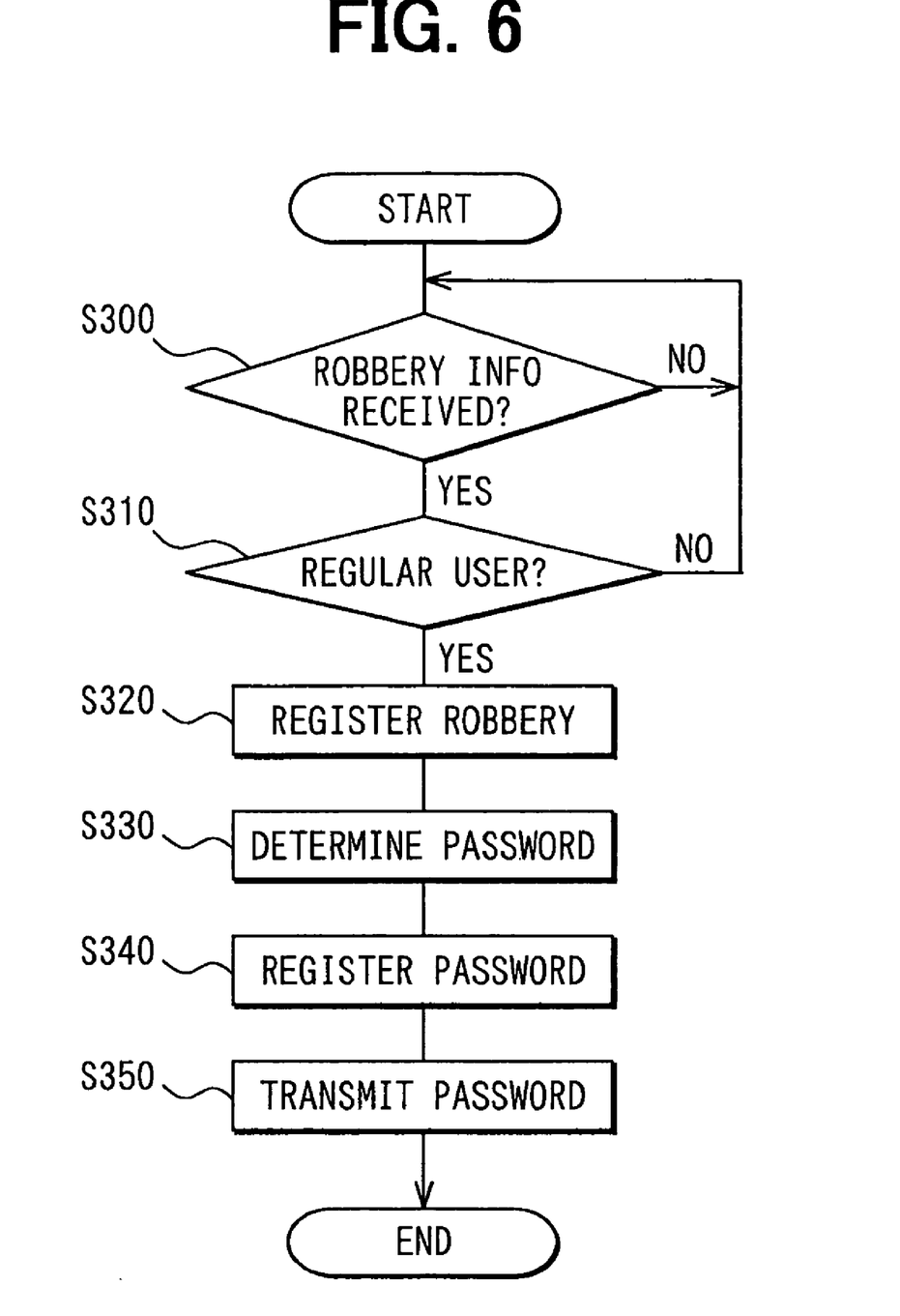
FIG. 6 is a flow chart diagram showing a process for a data center to determine a password according to the first embodiment.

This password (e.g., an eight-digit number) is automatically determined by the data center 11. In FIG. 6, a process in the data center 11 for determining the password is explained. (FIG. 6 does not explain items relating to an immobilizer-set instruction.) Upon receiving the report of the vehicle robbery from the user via the fixed-line phone 13 (S300: YES), the data center 11 determines whether the user is the regular user of the vehicle 1 by comparing the reported user voice pattern with the stored voice patterns at Step S310.

When the user is determined to be the regular user (S310: YES), the data center 11 recognizes an occurrence of the vehicle robbery and then registers it with the database 23 at Step S320. Next, a password is determined by selecting an un-used number from among the randomly selected multiple eight-digit numbers at Step S330. This un-used number means a number that is not used as a password in another vehicle robbery. Further, the data center 11 registers the determined password as the password for the vehicle 1, with the database 23 at Step S340, and transmits the password to the wireless base station 10 at Step S350.

Thus, since the data center 11 determines a password, a manager of the data center 11 can easily manage information relating to passwords. Further, it can prevent an incident that a user sets a password that is easily presumed by others, such as a birth date. Further, confirming whether a user that reports is the regular user can be performed differently. For instance, when a user reports the vehicle robbery via a fixed-line phone 13, a certain registered number such as a birth date is required to be inputted via the fixed-line phone 13 and the inputted number is verified with the registered number.

On the other hand, the wireless base station 10 that receives the immobilizer-set instruction and the password transmits them as wireless signals from the antenna 9.

When the antenna 4 receives the signal from the wireless base station 10, the communications ECU 5 confirms that the received signals are transmitted to the vehicle 1 and then transmits the signals to the immobilizer ECU 2. When the immobilizer ECU 2 receives them (S100: YES in FIG. 2), the immobilizer ECU 2 registers the password in the memory unit 3 (the former part of S110).

Next, the immobilizer ECU 2 obtains position information of the vehicle 1 from the navigation system 14 and then gives an instruction to the communications ECU 5 for transmitting the position information and acknowledgement information indicating reception of the immobilizer-set instruction. The communications ECU 5 that receives them transmits the position information and the acknowledgement information from the antenna 4 by wireless communications (the latter part of S110).

Further, the immobilizer ECU 2 determines an operating state of the engine 8 by communicating with the engine ECU 7 at Step S120. When the engine 8 is determined to be stopping or to be stopping after running (S120: YES), the immobilizer ECU 2 gives an instruction to the engine ECU 7 for prohibiting the start of the engine 8. The engine ECU 7 that receives the instruction prohibits the engine 8 from starting to thereby set the remote-activated immobilizer function (S130).

Thus, after the engine 8 stops once, the engine 8 is not allowed to re-start. As a result, even when a robber steals the regular key as well as the vehicle 1, an additional unauthorized use of the vehicle 1 can be prevented as far as the robber does not know the password.

On the other hand, the wireless base station 10 that receives the position information and the acknowledgement information transmits them to the data center 11. The data center 11 that receives them retrieves address information of the user of the vehicle 1 from the database 23 and sends a sealed letter containing the position information and the password determined by the data center 11 to the relevant address.

The user of the vehicle 1 can thereby know the position where the vehicle 1 is present when the remote-activated immobilizer function is set and the password for unsetting the remote-activated immobilizer function.

Here, since the password is sent to the address of the regular user by the letter, the risk that another knows the password is decreased. Further, instead of sending the letter, an electronic mail can be used for this purpose when the address of the electronic mail of the regular user is registered with the data center 11. Further, otherwise, it can be designed so that the user accesses a web site on the Internet (or homepage) managed by the data center 11 to retrieve the foregoing information.

Thereafter, when the user searches out the stolen vehicle 1, gets in the vehicle 1 and then turns on the accessory switch, the immobilizer ECU 2 causes the display 6 to enter a password input mode based on the accessory switch turning on. In the password input mode, the display 6 shows on its screen buttons representing numerals from 0 to 9 and enables the user to touch the relevant buttons to thereby input the password.

When receiving the inputted password from the display 6 (S140: YES), the immobilizer ECU 2 determines whether the received password accords with the password registered in the memory unit 3 at Step S150.

When the received password is determined to be according with the registered one (S160: YES), the immobilizer ECU 2 gives an instruction (immobilizer-unset instruction) to the engine ECU 7. The engine ECU 7 then unsets (or releases) the remote-activated immobilizer function by allowing the engine 8 to start (S160).

Thus, the engine 8 of the vehicle 1 can be started. Consequently, regardless of whether or not the vehicle 1 can receive the wireless signal from the wireless base station 10, only the regular user or the agent (or authorized person) of the vehicle 1 can unset the remote-activated immobilizer function.

Further, in this first embodiment, the user uses the display 6 used for the navigation system 14. However, it can be designed that a keyboard or numeric pad dedicated for inputting a password is installed near the driver's seat in the vehicle interior.

Further, when the display 6 enters the mode where a password can be inputted, a robber that steals the vehicle 1 may randomly input numbers using the display 6 to thereby by chance input the regular password. For this case, it can be designed that a preventing method is activated when wrong passwords are inputted serially three times. This preventing method is, for instance, releasing the mode where the password can be inputted, or halting the mode for a given interval.

In the first embodiment, the driving device of the vehicle 1 is an engine 8. However, the present invention can be directed to a vehicle security system relating to a vehicle where the driving device is an electric motor, or multiple driving devices in such a hybrid vehicle.

(Second Embodiment)

In a vehicle security system according to a second embodiment of the present invention, a cell phone is used for a user to input a password.

Figure 3:
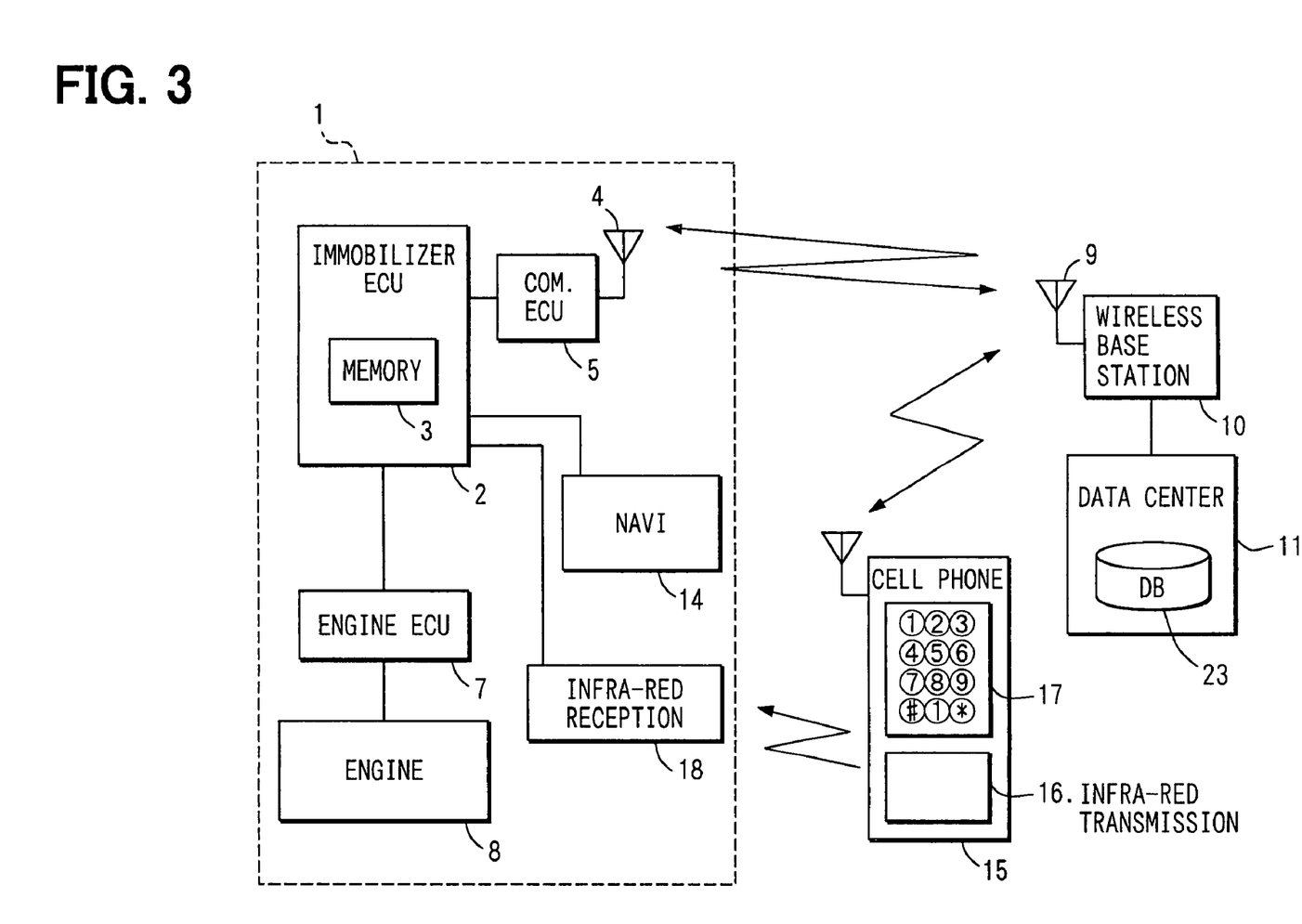
FIG. 3 is a diagram showing a schematic structure of a vehicle security system according to a second embodiment of the present invention.

FIG. 3 shows a structure of the vehicle security system according to the second embodiment. Here, the same constituents as in the first embodiment have the same numeral signs as in the first embodiment. Hereinbelow, different parts from the first embodiment will be mainly explained.

In the second embodiment, the display 6 is not installed. Instead, the infra-red light reception unit 18 is mounted to interface with the immobilizer ECU 2. The infra-red light reception unit 18 is disposed near the driver's seat in the vehicle interior.

The cell phone 15 has a button portion 17 for inputting numerals, and an infra-red light transmission unit 16 for transmitting signals using infra-red light. The button portion 17 is a button group composed of multiple buttons manipulated when the cell phone is used for calling.

Next, an operation of the vehicle security system of the second embodiment will be explained below. When a vehicle 1 is stolen, a user of the vehicle 1 reports the vehicle robbery to the data center 11 using the cell phone 15 or the like. In this case, the user notifies, to the data center 11, a password that is preferred by the user and used for unsetting the remote-activated immobilizer function set for the vehicle 1.

Figure 7:
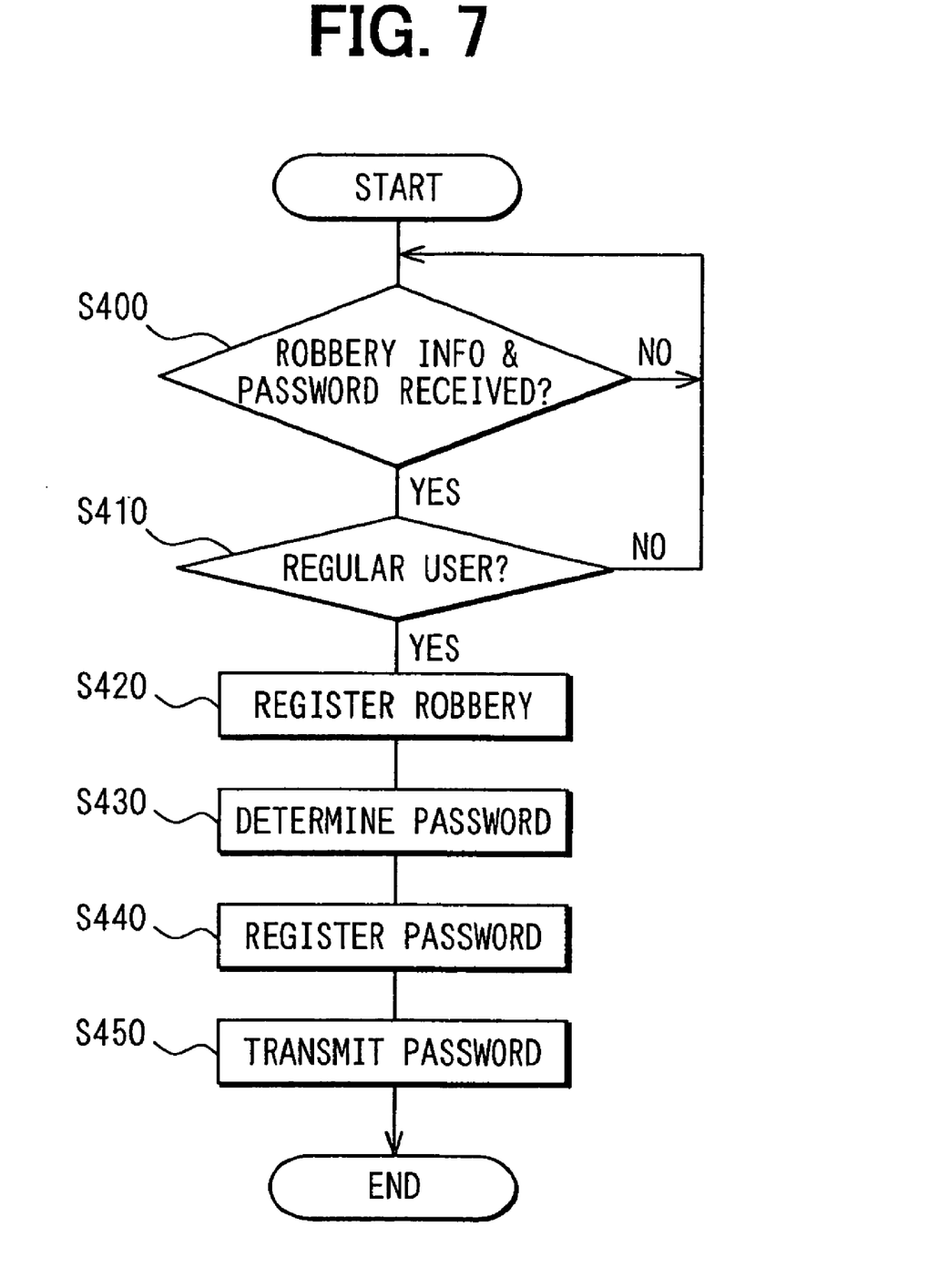
FIG. 7 is a flow chart diagram showing a process for a data center to adopt a password determined by a user according to the second embodiment.

Here, the data center 11 adopts the notified number as the password based on the flow chart shown in FIG. 7. Namely, when the data center 11 receives the vehicle robbery and the preferred password from the user (S400: YES), it is determined whether the relevant user is the regular user at Step S410, as previously explained in the first embodiment.

When the user is determined to be the regular user (S410: YES), the data center 11 recognizes an occurrence of the vehicle robbery and then registers it with the database 23 at Step S420. Next, the number received from the user is selected as the password at Step S430. Further, the data center 11 registers the determined password as the password for the vehicle 1 with the database 23 at Step S440, and transmits the password to the wireless base station 10 at Step S450.

Thus, since the number preferred by the user is selected as the password, the number that is easily memorized by the user can become the password. Here, it can be designed that the data center 11 has a function for checking whether the relevant number is proper for a password (e.g., whether the relevant number is not an easily presumed number such as a birth date and a number having a simple numeric order of 1, 2, 3, 4, 5, 6, 7, 8). Further, the data center 11 can provide several password candidates to the user so that the user selects one of them. In this case, the user notifies the data center 11 of the number representing the preferred password.

Further, when transmitting the password at Step S450, the data center 11 gives an immobilizer-set instruction to the wireless base station 10, similar to the first embodiment.

Figure 2:
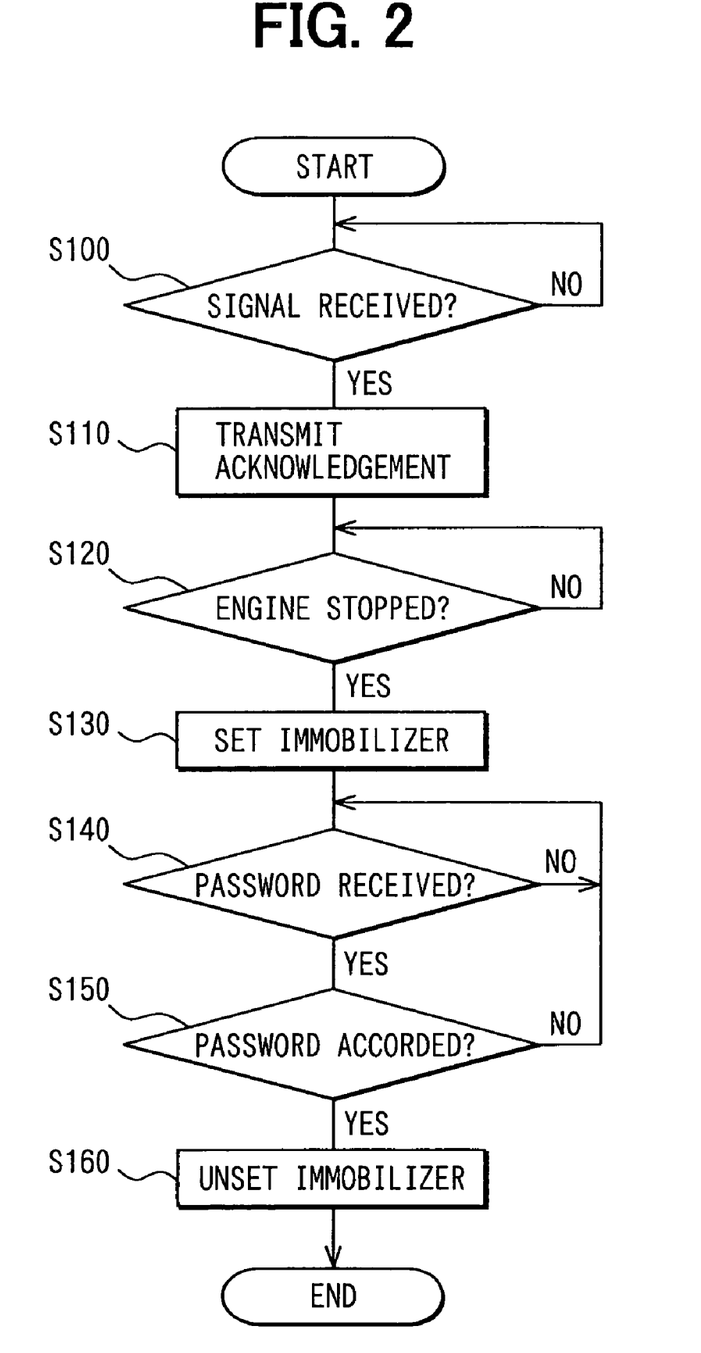
FIG. 2 is a flow chart diagram showing a process executed by a vehicle security system according to the first embodiment.

The flow performed until the remote-activated immobilizer function is set, is the same as that in the first embodiment (S100 to S130 in FIG. 2). Namely, under a condition where the number notified by the user is stored as the password in the memory unit 3 in the immobilizer ECU 2, the remote-activated immobilizer function is set for the vehicle 1. However, there is no password in the sealed letter or electronic mail transmitted from the data center 11 to the user. This is because the user determines the password and the need for notifying the password is low.

Thereafter, when the user searches out the stolen vehicle 1 and intends to unset the remote-activated immobilizer function, the user gets in the vehicle 1 and then manipulates the button portion 17 of the cell phone 15 to input the password and transmit the inputted password from the infra-red light transmission unit 16.

The signal transmitted from the infra-red light transmission unit 16 is received by the infra-red light reception unit 18 and then transmitted to the immobilizer ECU 2.

The flow performed until the remote-activated immobilizer function is unset is the same as that in the first embodiment (S140 to S160 in FIG. 2).

In the second embodiment, the user determines the password for unsetting the remote-activated immobilizer function so that the user can determine a password that is easily memorized. This enhances the user-friendliness of the vehicle security system.

Further, in the second embodiment, the password inputted by the user using the cell phone 15 is directly transmitted from the infra-red light transmission unit 16 of the cell phone 15 to the infra-red light reception unit 18. However, the password can be transmitted from the cell phone 15 via the wireless base station 10 and the antenna 4 of the vehicle 1 to the communications ECU 5 without using the infra-red light transmission unit 16 and the infra-red light reception unit 18. In this case, the stolen vehicle 1 is required to be in a state where signals from the wireless base station 10 are received.

Further, the cell phone 15 can be replaced by a personal digital assistant (PDA), a notebook computer, or a dedicated wireless terminal for inputting a password. Further, communications between these portable information inputting devices and the signal reception unit of the vehicle 1 is not limited to the infra-red light communications that is used in the second embodiment.

(Third Embodiment)

In a vehicle security system according to a third embodiment of the present invention, a dedicated password input device that is attachable to and detachable from a connector installed in the vehicle 1 is used for a user to input a password.

Figure 4:
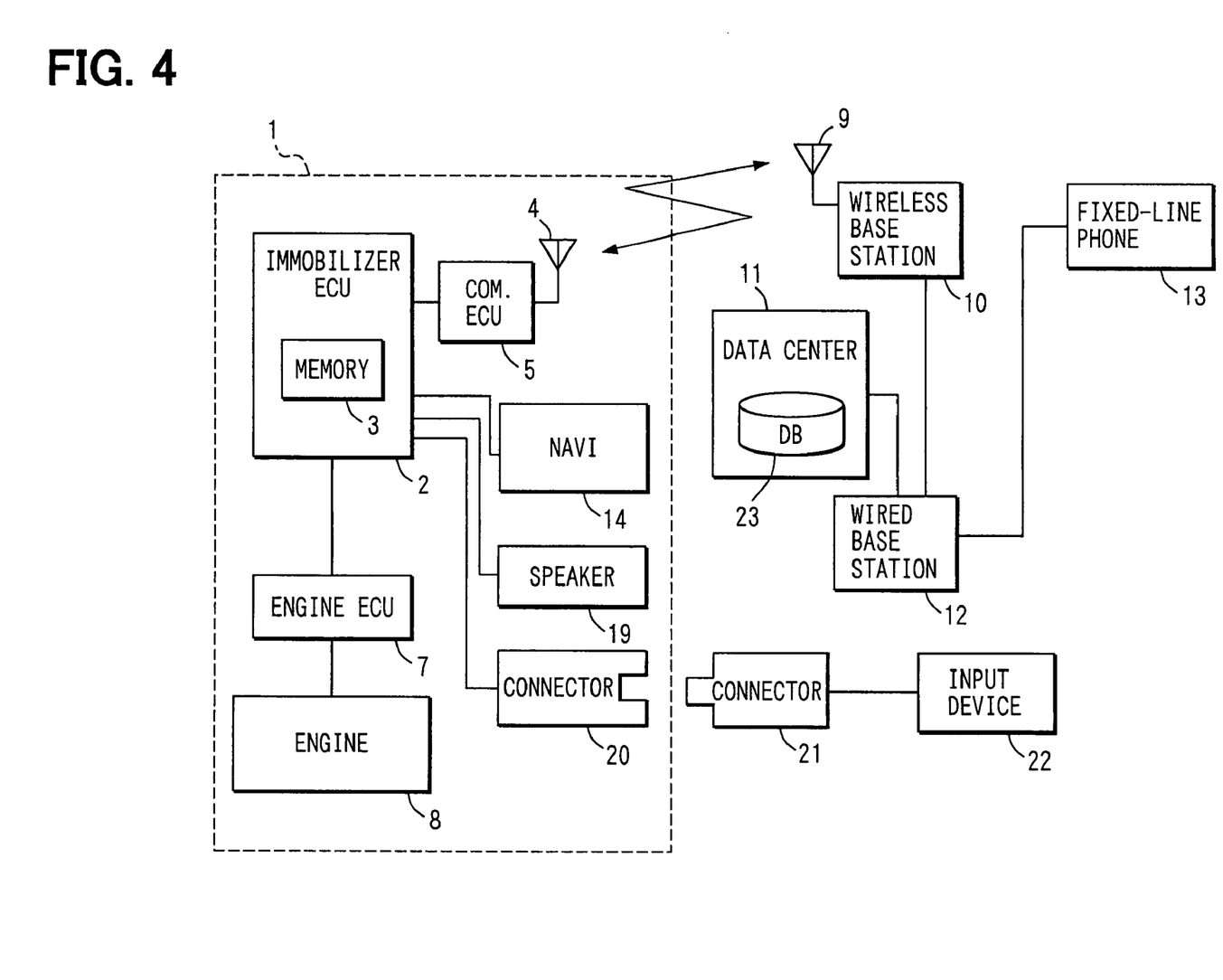
FIG. 4 is a diagram showing a schematic structure of a vehicle security system according to a third embodiment of the present invention.

FIG. 4 shows a structure of the vehicle security system according to the third embodiment. Here, the same constituents as those in the first embodiment have the same numeral signs as in the first embodiment. In this embodiment, the password is determined by the data center 11. The discussion below will mainly explain parts which are different from the first embodiment.

In the third embodiment, the display 6 is not mounted. Instead, a speaker 19 and a connector 20 that are interfaced with the immobilizer ECU 2 are mounted. The speaker 19 is used for an audio system (not shown) mounted in the vehicle 1. The connector 20 is disposed inside a container box in the dashboard (not shown) in the vehicle interior so as not to interfere with the usual operation in the vehicle 1.

A password input device 22 is used for inputting a password used for unsetting the remote-activated immobilizer function. The password input device 22 is not usually mounted in the vehicle 1, but usually stored in a vehicle dealer, a data center 11, or a police office. When the password input device 22 is required to be used, the password input device 22 is borrowed from the relevant entity.

The password input device 22 has buttons (not shown) for inputting a password and is connected with a connector 21. The connector 21 is able to be connected with the connector 20 in the vehicle 1. When the connector 21 is being connected with the connector 20, a password can be transmitted to the immobilizer ECU 2 by manipulating the buttons of the password input device 22.

Figure 5:
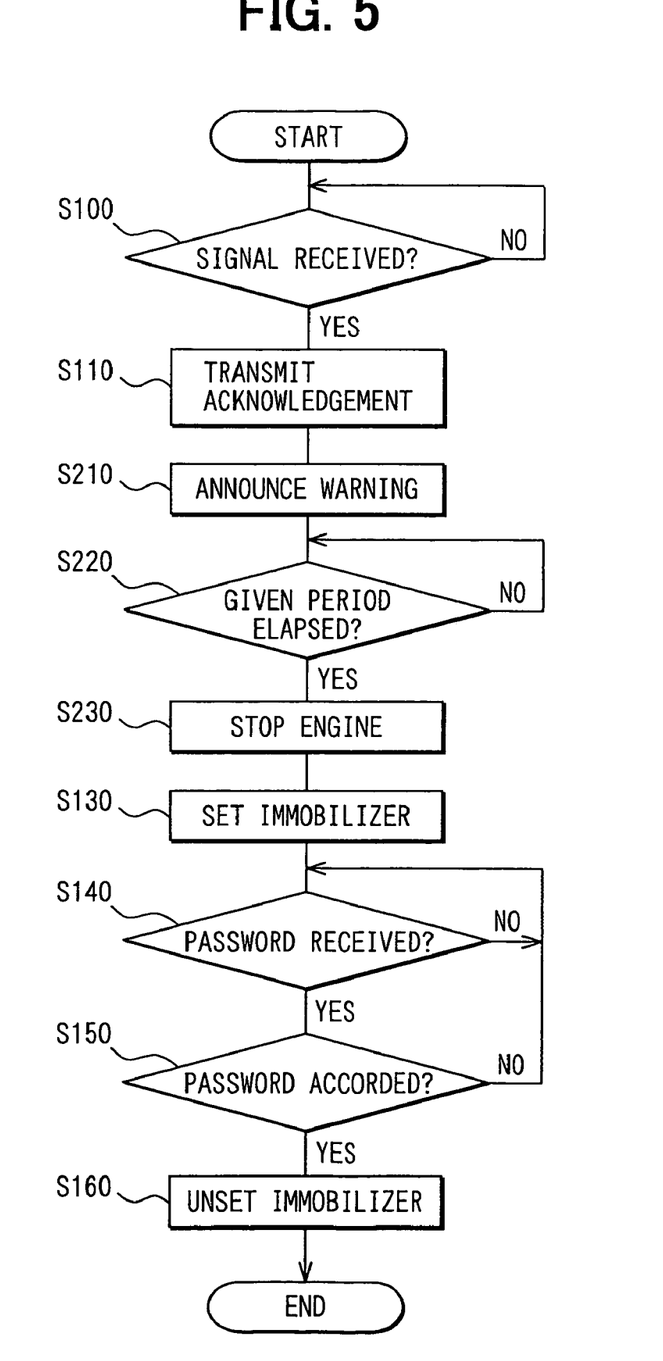
FIG. 5 is a flow chart diagram showing a process executed by a vehicle security system according to the third embodiment.

Next, an operation of the vehicle security system of the third embodiment will be explained with reference to FIG. 5. In the flow chart in FIG. 5, S120 to S230 are substituted for S120 in FIG. 2. Other steps are the same as in FIG. 2, so that different parts from the flow chart in FIG. 2 will be mainly explained below.

In the third embodiment, when the communications ECU 5 receives information relating to an immobilizer-set instruction and a password, the engine ECU 7 forcibly stops the engine 8. This is a feature of the third embodiment.

After the process at Step S110 is completed similar to the first embodiment, the immobilizer ECU 2 outputs a signal that causes the speaker 19 to announce a warning that the engine 8 automatically stops in a given period (e.g., five minutes). The speaker 19 that receives the signal announces the warning at Step S210.

Thereafter, when the immobilizer ECU 2 determines that the given period elapses (S220: YES), the immobilizer ECU 2 outputs the immobilizer-set instruction to the engine ECU 7. Upon receiving the instruction, the engine ECU 7 directly causes the engine 8 to stop and then prohibits the re-start of the engine 8. (Here, when the engine 8 is already stopped, the engine ECU 7 only prohibits the re-start of the engine 8.) Thus, the remote-activated immobilizer function is set at Step S130.

In this case, the given period is set from when the warning is announced to when the engine 8 is forcibly stopped. This is for giving a period for the driver of the vehicle 1 to move the vehicle 1 to a place where the vehicle 1 can be parked. Further, when the engine ECU 7 actually stops the engine 8, the following procedures can be included. Namely, the traveling speed of the vehicle 1 or the rotation number of the engine 8 is measured or the movement of the vehicle position is measured by the navigation system 14 so that it is determined whether the vehicle 1 is stopping or not. Only when the vehicle 1 is determined to be stopping, the engine 8 is stopped.

Further, the flow chart (S140 to S160 in FIG. 5) performed when the respective devices mounted in the vehicle 1 unset the remote-activated immobilizer function is the same as that (S140 to S160 in FIG. 2) in the first embodiment. However, a person who intends to unset the remote-activated immobilizer function needs to connect the connector 21 of the password input device 22 to the connector 20 in the vehicle 1 and then input the password by manipulating the buttons in the password input device 22.

Here, the above password can be automatically transmitted from the data center 11 to the password input device 22 via the wireless base station 10. In this case, the password input device 22 needs to include a communications unit having an antenna. In this structure, inputting the password by manipulating the buttons becomes unnecessary, so that a person who intends to unset the remote-activated immobilizer function does not need to memorize the password. This can enhance the user-friendliness of this vehicle security system.

It will be obvious to those skilled in the art that various changes may be made in the above-described embodiments of the present invention. However, the scope of the present invention should be determined by the following claims.

What is claimed is:

1. A vehicle security system comprising:
    a driving-device controlling unit that controls a driving device provided in a vehicle;
    a signal receiving unit configured to receive a signal that is transmitted from a wireless base station and requires the driving device to be prohibited from starting, the signal including a first password for releasing the driving device from the prohibition of starting;
    a password inputting unit configured to input a second password;
    a prohibition instruction outputting unit configured to output an instruction for prohibiting the driving device from starting, the instruction for prohibiting being outputted to the driving-device controlling unit based on the signal received by the signal receiving unit; and
    a permission instruction outputting unit configured to output an instruction for allowing the driving device, which is prohibited from starting, to start, the instruction for allowing being outputted to the driving-device controlling unit when the second password inputted by the password inputting unit is identical to the first password included in the signal received by the signal receiving unit.

2. The vehicle security system of claim 1, further comprising:
    a data center configured to facilitate communicating with the wireless base station and manages vehicle robbery information, wherein the data center includes:
a recognizing unit configured to recognize a vehicle robbery;
a password determining unit configured to determine the first password based on recognizing of the vehicle robbery; and
a transmitting unit configured to transmit the determined first password to the wireless base station.

3. The vehicle security system of claim 1, further comprising:
a data center configured to facilitate communicating with the wireless base station and manages vehicle robbery information,
wherein the data center includes:
a receiving unit configured to receive numeral information transmitted from a user of the vehicle;
a password determining unit that determines a configured to determine the first password based on the received numeral information; and
a transmitting unit configured to transmit the determined first password to the wireless base station.

4. The vehicle security system of claim 1,
wherein the password inputting unit includes an information inputting unit provided in an interior of the vehicle.

5. The vehicle security system of claim 1,
wherein the password inputting unit includes a portable information inputting unit that is capable of communicating using wireless communications.

6. The vehicle security system of claim 1,
wherein the password inputting unit includes an information inputting unit that is detachable from a connecting terminal provided in the vehicle.

7. The vehicle security system of claim 1,
wherein the driving-device controlling unit is configured to cause the driving device, which is running, to stop when the driving-device controlling unit receives an instruction for prohibiting the driving device from starting.

8. A method for unsetting an immobilizer function in a driving device provided in a vehicle, the method comprising:
receiving a signal transmitted via a wireless base station to activate an immobilizer function to immobilize the driving device, the signal including an unsetting password for unsetting the immobilizer function;
activating the immobilizer function to immobilize the driving device upon receiving the signal;
inputting, without the wireless base station intervening, a password via an inputting unit in the vehicle while the driving device is immobilized; and
releasing the activated immobilizer function in the driving device when the password inputted via the password inputting unit is identical to the unsetting password included in the signal received via the wireless base station.

* * * * *